(12) United States Patent
Matsumoto et al.

(10) Patent No.: US 9,394,003 B2
(45) Date of Patent: Jul. 19, 2016

(54) VEHICLE FRAMEWORK STRUCTURE

(71) Applicant: TOYOTA JIDOSHA KABUSHIKI KAISHA, Toyota-shi, Aichi-ken (JP)

(72) Inventors: Shinpei Matsumoto, Nagoya (JP); Masahiro Onoda, Toyota (JP); Toshiyuki Kasai, Miyoshi (JP); Kyohei Ishimoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/636,824

(22) Filed: Mar. 3, 2015

(65) Prior Publication Data
US 2015/0246690 A1    Sep. 3, 2015

(30) Foreign Application Priority Data

Mar. 3, 2014    (JP) .................................. 2014-040975

(51) Int. Cl.
*B60N 99/00*    (2006.01)
*B62D 21/15*    (2006.01)
*B62D 21/02*    (2006.01)

(52) U.S. Cl.
CPC .............. *B62D 21/152* (2013.01); *B62D 21/02* (2013.01)

(58) Field of Classification Search
CPC .............................. B62D 21/152; B62D 21/02
See application file for complete search history.

(56) References Cited

U.S. PATENT DOCUMENTS

| 3,543,977 | A | * | 12/1970 | Lockridge | A44B 18/00 128/DIG. 15 |
| 5,718,048 | A | * | 2/1998 | Horton | B21D 5/08 280/785 |
| 6,250,679 | B1 | * | 6/2001 | Schnell | B62D 21/02 280/785 |
| 6,523,876 | B1 | * | 2/2003 | Durand | B62D 21/02 280/797 |
| 2010/0045072 | A1 | | 2/2010 | Yamada et al. | |

FOREIGN PATENT DOCUMENTS

| JP | 2000-211555 A | 8/2000 |
| JP | 2009280106 A | 12/2009 |
| JP | 2010-047114 A | 3/2010 |
| JP | 2013193571 A | 9/2013 |

\* cited by examiner

Primary Examiner — Lori L Lyjak
(74) *Attorney, Agent, or Firm* — Oliff PLC

(57) ABSTRACT

A vehicle framework structure includes: a side rail that is placed on an outer side, in a vehicle width direction, of a vehicle lower portion of a vehicle with a frame, and that is extended along a vehicle front-rear direction, a dimension, in a vehicle width direction, between front sides of the side rails in a vehicle front-rear direction being shorter than that between rear sides thereof, and the front side in the vehicle front-rear direction being connected to the rear side by a bending portion; an outrigger provided in the bending portion and projecting outward in the vehicle width direction; and a load transmission member provided in the side rail, the load transmission member overlapping with the outrigger in a vehicle side view.

6 Claims, 10 Drawing Sheets

VEHICLE FRAMEWORK STRUCTURE

INCORPORATION BY REFERENCE

The disclosure of Japanese Patent Application No. 2014-040975 filed on Mar. 3, 2014 including the specification, drawings and abstract is incorporated herein by reference in its entirety.

BACKGROUND OF THE INVENTION

1. Field of the Invention

The present invention relates to a vehicle framework structure.

2. Description of Related Art

Japanese Patent Application Publication No. 2009-280106 (JP 2009-280106 A) describes a structure in which a cab mount bracket (an outrigger) projects outward from a side rail in a vehicle width direction in a vehicle with a frame.

In the meantime, Japanese Patent Application Publication No. 2013-193571 (JP 2013-193571 A) describes a structure in which a gusset is provided between a front side frame (a side rail) and a lower member and a bulk head (a load transmission member) is provided in the front side frame on an extended line of the gusset.

In general, in a case of a front end collision (hereinafter referred to as a "small overlap collision") in which a collision load from a vehicle front side is input into an outer side of a front side member in the vehicle width direction, the collision load may not be input into a front end part of a side rail placed on a rear side of the front side member in a vehicle front-rear direction. In such a case, the collision load is directly input into a cab mount bracket projecting outward from the side rail in the vehicle width direction. In view of this, there is room for the improvement in terms of transmitting a load from the cab mount bracket to the rear side in the vehicle front-rear direction.

SUMMARY OF THE INVENTION

The present invention provides a vehicle framework structure that allows a collision load input into an outrigger projecting outward from a side rail in the vehicle width direction, to be transmitted efficiently to a rear side relative to the outrigger.

An aspect of the present invention relates to a vehicle framework structure. The vehicle framework structure includes: a side rail that is placed on an outer side, in a vehicle width direction, of a vehicle lower portion of a vehicle with a frame, and that is extended along a vehicle front-rear direction, a dimension, in a vehicle width direction, between front sides of the side rails in the vehicle front-rear direction being shorter than that between rear sides thereof, and the front side in the vehicle front-rear direction being connected to the rear side by a bending portion; an outrigger provided in the bending portion and projecting outward in the vehicle width direction; and a load transmission member provided in the side rail, the load transmission member overlapping with the outrigger in a vehicle side view.

In the above aspect, the side rail is placed on the outer side, in the vehicle width direction, of the vehicle lower portion of the vehicle with a frame, so as to be extended in the vehicle front-rear direction. The side rail is formed such that the dimension, in the vehicle width direction, of the front side thereof in the vehicle front-rear direction is shorter than that of the rear side thereof, and the side rail is configured such that the front side in the vehicle front-rear direction is connected to the rear side by the bending portion. That is, the bending portion is formed to be bent outward, in the vehicle width direction, from the front part of the side rail in the vehicle front-rear direction. The outrigger is provided in the bending portion of the side rail so as to project outward in the vehicle width direction. Further, the load transmission member is provided inside the side rail. This makes it possible to reinforce the side rail, and to restrain deformation of the side rail at the time of a small overlap collision of the vehicle.

According to the above aspect, the load transmission member is placed so as to overlap with the outrigger in a vehicle side view. When a collision load is input into the outrigger at the time of a small overlap collision of the vehicle, the collision load is locally concentrated on the outrigger. However, in this case, the collision load is transmitted to the load transmission member from the outrigger. Then, the collision load transmitted to the load transmission member can be transmitted to the rear side with respect to the outrigger along an extending direction of the side rail via that surface of the side rail with which the load transmission member makes contact.

As described above, the above aspect of the present invention has an excellent effect of restraining deformation of the side rail and efficiently transmitting, to the rear side with respect to the outrigger, a collision load input into the outrigger projecting outward from the side rail in the vehicle width direction.

In the above aspect, a front part of the load transmission member in the vehicle front-rear direction may overlap with a rear part of the outrigger in the vehicle front-rear direction in a vehicle side view.

According to the above aspect, the front part of the load transmission member is placed so as to overlap with the rear part of the outrigger in a vehicle side view. On that account, the collision load transmitted to the front part of the load transmission member is transmitted to the rear side with respect to the load transmission member. Since the load transmission member is provided inside the side rail, the collision load input into the outrigger can be further effectively transmitted to the rear side with respect to the outrigger along the extending direction of the side rail via the load transmission member.

The vehicle framework structure of the above aspect has an excellent effect of further efficiently transmitting, to the rear side with respect to the outrigger, the collision load input into the outrigger projecting outward in the vehicle width direction from the side rail.

In the above aspect, the load transmission member may be provided with at least one of a front wall placed in a front part of the load transmission member in the vehicle front-rear direction and formed along the vehicle width direction, or a rear wall placed in a rear part of the load transmission member in the vehicle front-rear direction and formed along the vehicle width direction.

According to the above aspect, the load transmission member is provided with at least one of the front wall placed in the front part of the load transmission member and formed along the vehicle width direction, and the rear wall placed in the rear part of the load transmission member and formed along the vehicle width direction. Accordingly, it is possible to reinforce the side rail against the collision load applied thereto from the outrigger in the vehicle width direction.

The vehicle framework structure of the above aspect has an excellent effect of improving durability of the side rail against stress in the vehicle width direction.

In the above aspect, a cross member may be provided over a pair of side rails disposed on opposite sides in the vehicle width direction and placed on a rear side with respect to the outrigger in the vehicle front-rear direction, and the cross member may overlap with the load transmission member in a vehicle side view.

According to the above aspect, the cross member is provided over the pair of side rails disposed on opposite sides in the vehicle width direction. The cross member and the load transmission member overlap with each other in a vehicle side view. Hereby, when a collision load is input into the outrigger, the load transmission can be transmitted (dispersed) to not only the side rail but also the cross member from the outrigger via the load transmission member. That is, the collision load input into the outrigger can be transmitted to the rear side with respect to the outrigger and along the vehicle width direction of the outrigger.

The vehicle framework structure of the above aspect is configured such that the load transmission member is provided so as to overlap with the outrigger and the cross member in a vehicle side view, and hereby has an excellent effect of improving load transmission efficiency.

In the above aspect, an inclined portion inclined toward a joining portion of the cross member to the side rail may be provided in a rear end of the outrigger in the vehicle front-rear direction.

According to the above aspect, the inclined portion inclined toward the joining portion of the cross member is provided in the rear end of the outrigger. On that account, when a collision load is input into the outrigger, the inclined portion serves as a wedge so that the load is transmitted to the load transmission member. Eventually, the collision load is transmitted to a cross-member side.

The vehicle framework structure of the above aspect has an effect of further improving load transmission efficiency from the outrigger to the cross member.

In the above aspect, a reinforcing portion may be provided in a rear part of the outrigger in the vehicle front-rear direction, and the rear part of the outrigger in the vehicle front-rear direction is set to have strength higher than that of a front part thereof in the vehicle front-rear direction.

According to the above aspect, the reinforced portion is provided in the rear part of the outrigger, and the rear part of the outrigger has strength higher than that of the front part thereof due to the reinforced portion. Hereby, when a collision load is input into the outrigger, the collision load can be surely transmitted from the outrigger to the load transmission member.

The vehicle framework structure of the above aspect has an excellent effect of achieving effective load transmission to the rear side of the outrigger.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes a vehicle framework structure according to the present embodiment with reference to the drawings. Note that an arrow UP in the figures indicates a vehicle upper direction, an arrow FR indicates a vehicle front direction, an arrow RH indicates a vehicle right direction, and an arrow LH indicates a vehicle left direction. Hereinafter, in a case where a description is made by use of merely directions of front and rear, up and down, and right and left without any special mention, they indicate front and rear in a vehicle front-rear direction, up and down in a vehicle up-down direction, and right and left in a vehicle right-left direction (a vehicle width direction).

(Configuration of Vehicle Framework Structure)

Figure 1:
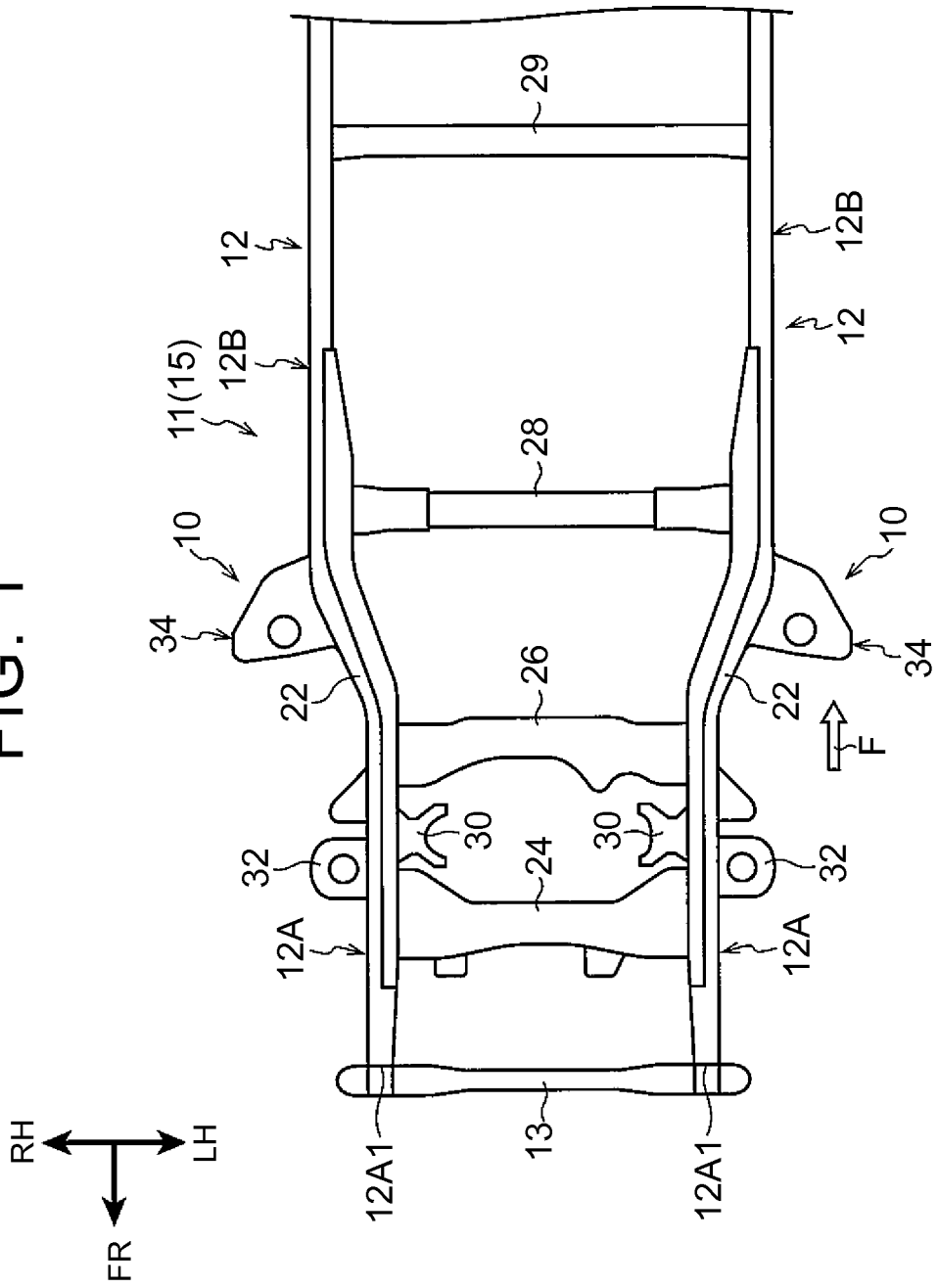
FIG. 1 illustrates a vehicle lower structure to which a vehicle framework structure according to an embodiment of the present invention is applied.

FIG. 1 illustrates a vehicle lower structure (a frame) 11 of a vehicle 15 with a frame, and a vehicle framework structure 10 according to the present embodiment is applied to the vehicle lower structure 11. As illustrated in FIG. 1, the vehicle lower structure 11 is configured such that side rails 12 are provided as a vehicle-body frame member on opposite sides of the vehicle lower structure 11 in the vehicle width direction so that the side rails 12 are extended along the vehicle front-rear direction.

Figure 3:
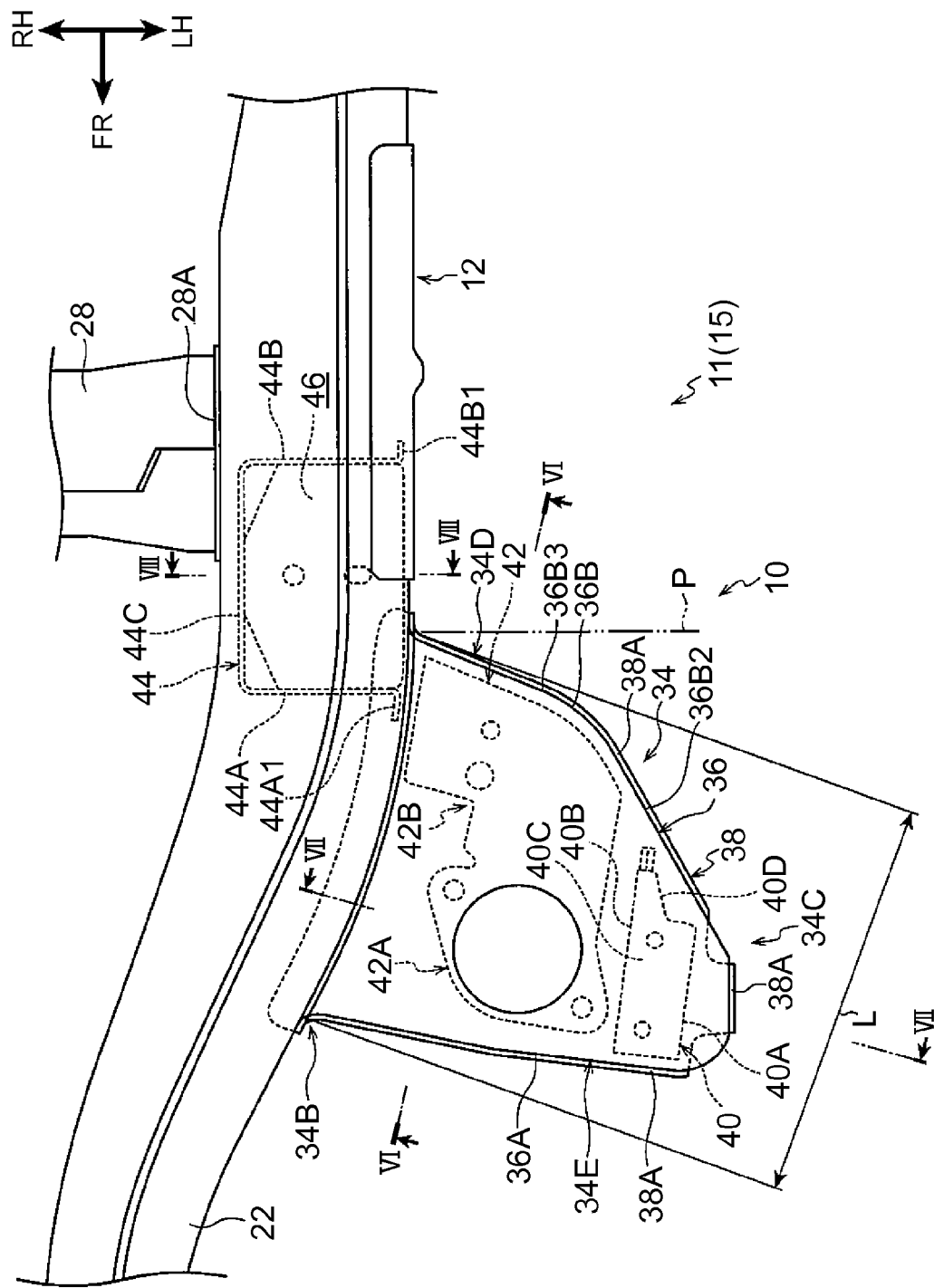
FIG. 3 is a part enlarged plan view illustrating a part of the vehicle framework structure according to the embodiment of the present invention in an enlarged manner.
Figure 8:
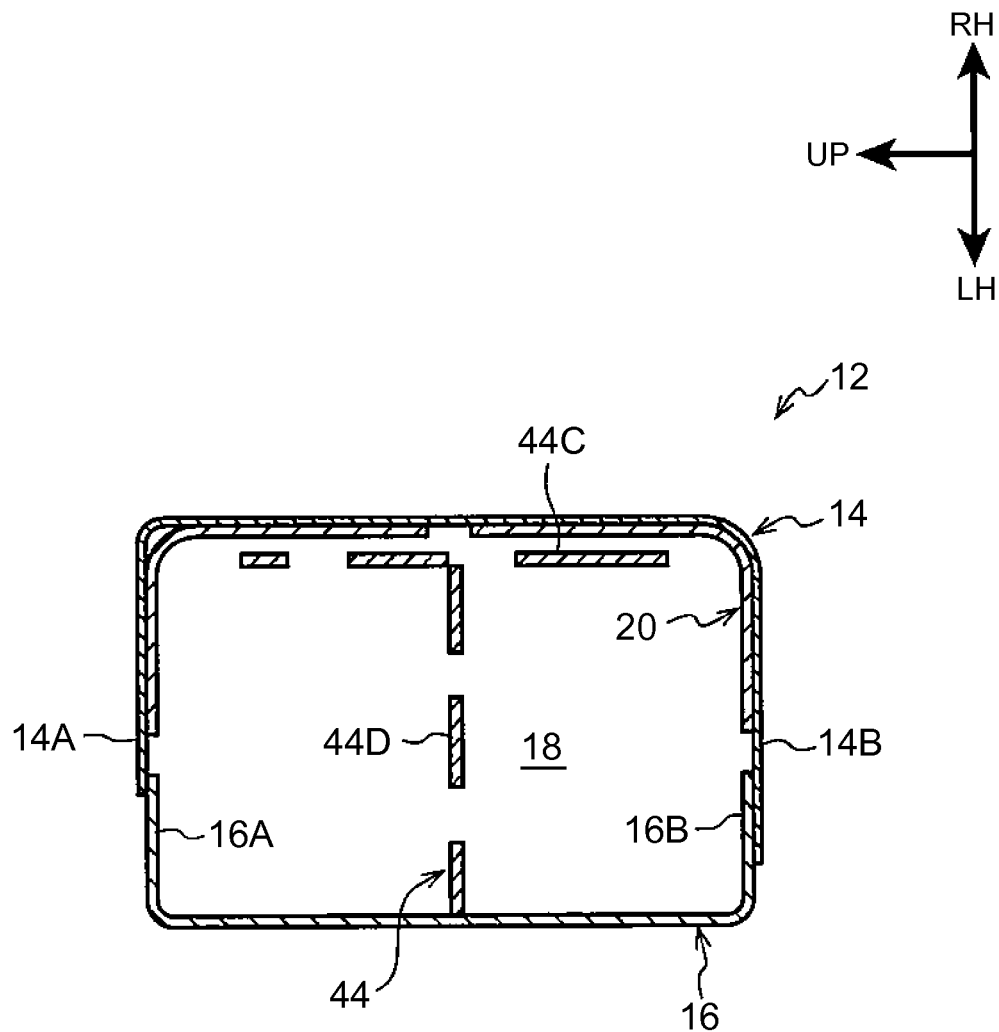
FIG. 8 is a drawing of a longitudinal section illustrating the outrigger taken along a line VIII-VIII in FIG. 3.

Here, FIG. 8 is a drawing of a longitudinal section of the side rail 12, taken along a line VIII-VIII in FIG. 3. As illustrated in FIG. 8, the side rail 12 is constituted by a side rail inner 14 constituting an inner part of the side rail 12 in the vehicle width direction, and a side rail outer 16 constituting an outer part of the side rail 12 in the vehicle width direction.

The side rail inner 14 and the side rail outer 16 are made of a steel material. The side rail inner 14 is configured such that its section taken along the vehicle width direction has a generally U-shape that is open outward in the vehicle width direction. In the meantime, the side rail outer 16 is configured such that its section taken along the vehicle width direction has a generally U-shape that is open toward inward in the vehicle width direction.

An upper wall 14A of the side rail inner 14 and an upper wall 16A of the side rail outer 16 are placed in a state where their tip sides overlap with each other in the vehicle up-down direction. Further, a lower wall 14B of the side rail inner 14 and a lower wall 16B of the side rail outer 16 are placed in a state where their tip sides overlap with each other in the vehicle up-down direction. They are joined to each other, so as to form a rectangular closed section portion 18 in the side rail 12.

Note that, in the present embodiment, a side rail reinforcement 20 formed to fit a shape of the side rail inner 14 is joined to an inner side of the side rail inner 14 by welding or the like. However, the side rail reinforcement 20 is not necessarily required.

Further, as illustrated in FIG. 1, a front wheel (not shown) is placed on an outer side, in the vehicle width direction, of a front part 12A of the side rail 12. Because of this, in consideration of interference with the front wheel, a dimension in the vehicle width direction is set shorter on a front-part-12A side of the side rail 12 than on a central-part-12B side, in the vehicle front-rear direction, of the side rail 12.

Accordingly, in the side rail 12, a bending portion 22 is provided between the front part 12A and the central part 12B in the vehicle front-rear direction. The bending portion 22 is inclined outward in the vehicle width direction from the front part 12A of the side rail 12 toward a vehicle rear side. Note that the bending portion 22 is inclined downward from the front part 12A of the side rail 12 toward the vehicle rear side.

Further, a bumper reinforcement 13 is provided, along the vehicle width direction, over front end parts 12A1 of the side rails 12 provided in pair. Note that, although not illustrated herein, a so-called crash box may be disposed between the front end part 12A1 of the side rail 12 and the bumper reinforcement 13.

Further, a plurality of cross members 24, 26, 28, 29 is provided, along the vehicle width direction, over the side rails 12 provided in pair. Hereby, in the vehicle framework structure 10 of the present embodiment, the frame 11 having a ladder shape is formed. Note that the cross members 24, 26 are provided on the front-part-12A sides of the side rails 12, and the cross members 28, 29 are provided on the central-part-12B sides of the side rails 12. In FIG. 1, a front side of the vehicle lower structure 11, including the front parts 12A and the central parts 12B of the side rails 12, is illustrated. However, on a rear side relative to this, a plurality of cross members is also provided over the side rails 12 provided in pair.

A metal engine mount bracket 30 projecting inward from the side rail 12 in the vehicle width direction is provided between the cross member 24 and the cross member 26 in the front part 12A of the side rail 12. Although not illustrated herein, an engine mount is attached to the engine mount bracket 30, and an engine unit is connected to the side rail 12 via the engine mount and the engine mount bracket 30.

Further, a metal suspension mount bracket 32 projecting outward from the side rail 12 in the vehicle width direction is provided between the cross member 24 and the cross member 26 in the front part 12A of the side rail 12. Although not illustrated herein, a suspension mount is attached to the suspension mount bracket 32, and a suspension unit is connected to the side rail 12 via the suspension mount and the suspension mount bracket 32.

Further, as described above, the bending portion 22 is provided between the front part 12A and the central part 12B of the side rail 12. However, a metal cab mount bracket 34 is provided in the bending portion 22 in a state where the cab mount bracket 34 projects outward in the vehicle width direction. As described above, the side rails 12 are configured such that the dimension, in the vehicle width direction, between the front parts 12A is set shorter than that between the central parts 12B of the side rails 12 in the vehicle front-rear direction. Because of this, when viewed from the vehicle front side, the cab mount bracket 34 projects most outward in the vehicle width direction in the vehicle lower structure 11.

In the meantime, an attachment hole 34A via which a cab mount (not shown) is attached is formed in the cab mount bracket 34, and a cab (a body) (not shown) is connected to the side rail 12 via the cab mount and the cab mount bracket 34.

Figure 4:
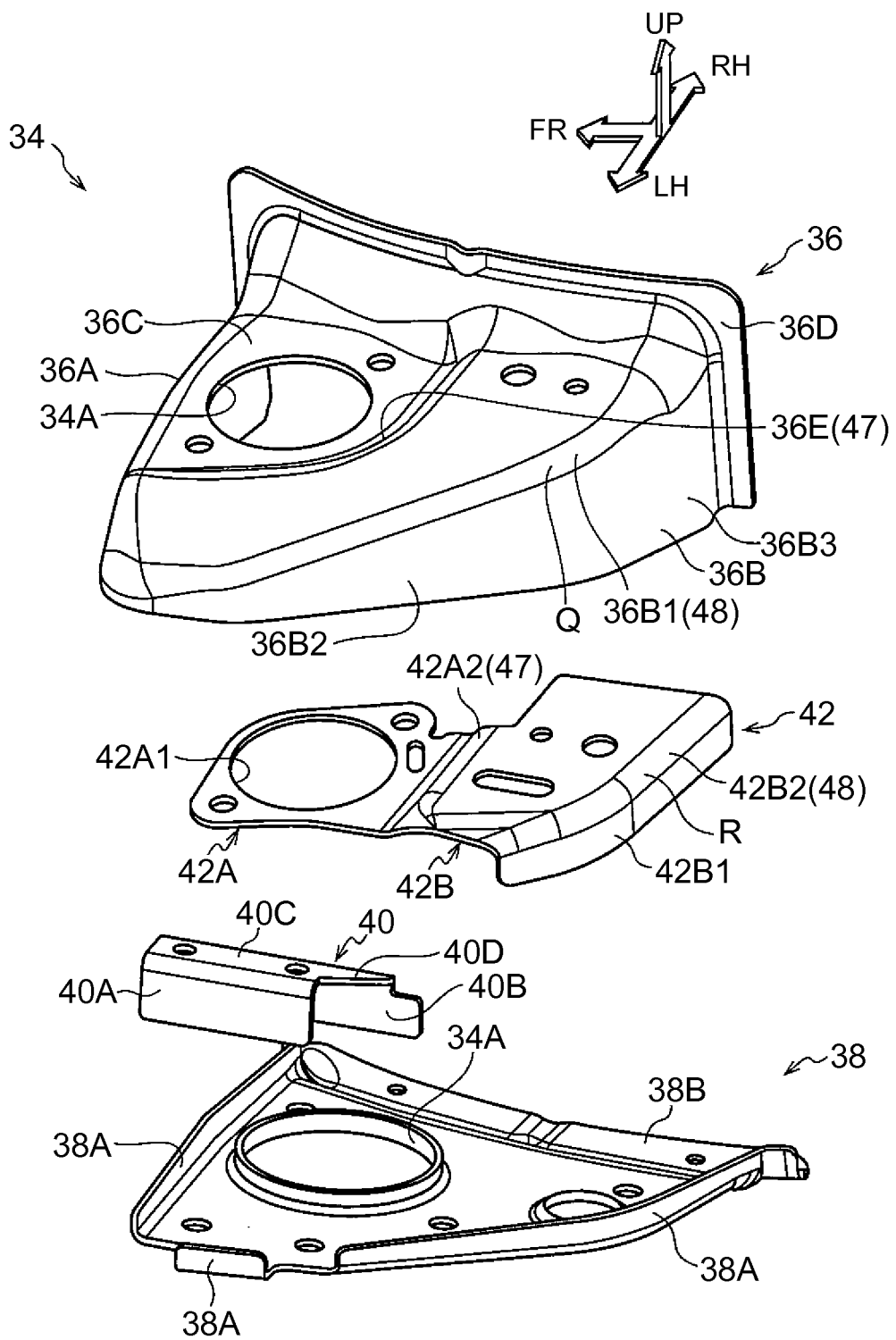
FIG. 4 is an exploded perspective view to describe one part of a configuration of the vehicle framework structure according to the embodiment of the present invention.
Figure 6:
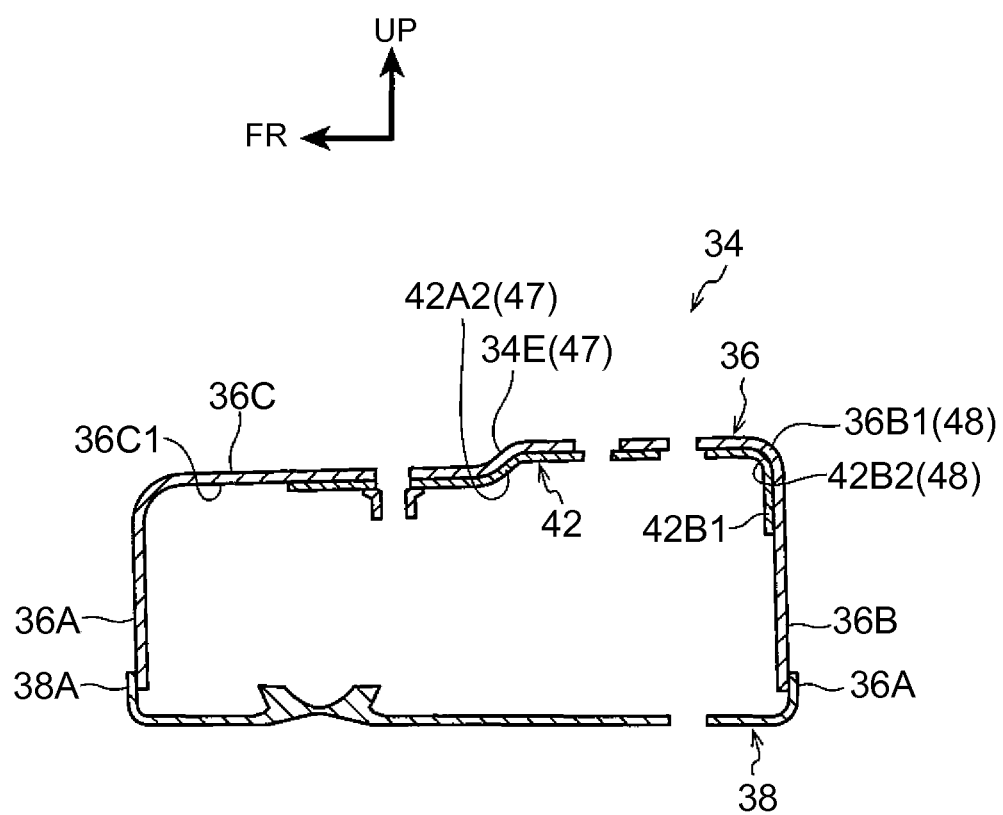
FIG. 6 is a drawing of a longitudinal section illustrating an outrigger taken along a line VI-VI in FIG. 3.

As illustrated in FIG. 4, the cab mount bracket 34 is constituted by an upper bracket 36 and a lower bracket 38. Here, FIG. 6 is a drawing of a longitudinal section taken along a line VI-VI in FIG. 3. As illustrated in FIG. 6, the upper bracket 36 is configured such that its section taken along the vehicle front-rear direction has a generally reversed U-shape that is open downward.

Figure 2:
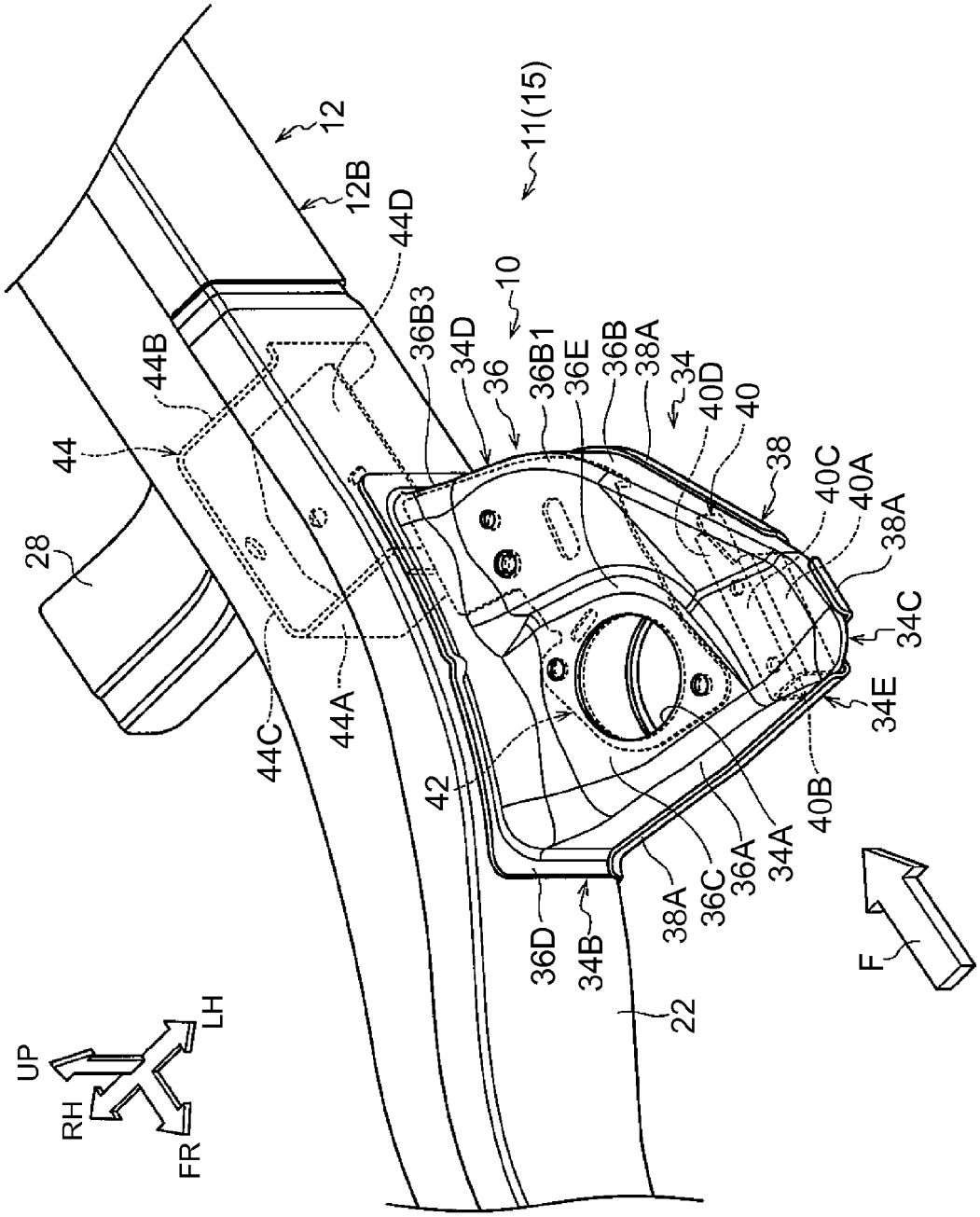
FIG. 2 is a part enlarged perspective view illustrating a part of the vehicle framework structure according to the embodiment of the present invention in an enlarged manner.

The upper bracket 36 is constituted by a front wall 36A placed in a front part of the upper bracket 36 in the vehicle front-rear direction, a rear wall 36B placed in a rear part of the upper bracket 36 in the vehicle front-rear direction, and an upper wall 36C placed in an upper part of the upper bracket 36 so as to connect the front wall 36A and the rear wall 36B. FIG. 2 is a perspective view illustrating a part of the vehicle framework structure 10 in FIG. 1 in an enlarged manner. As illustrated in FIG. 2, a flange portion 36D projects outward from an inner end, in the vehicle width direction, of the upper bracket 36 so as to be opposed to the side rail 12. The flange portion 36D abuts with the side rail 12, and is joined thereto by welding.

In a center of a front part of the upper wall 36C of the upper bracket 36, the attachment hole 34A via which the cab mount (not shown) is attached is formed. A stepped portion 36E as one of a plurality of reinforcing portions 47 is provided around the attachment hole 34A. The stepped portion 36E is formed so that the front part of the upper wall 36C is one step higher than the rear part thereof. The stepped portion 36E is formed rearward from an outer side, in the vehicle width direction, of the attachment hole 34A, and further extends toward a side-rail-12 side along the vehicle width direction.

As illustrated in FIG. 3, the upper bracket 36 is formed such that a dimension L thereof along the vehicle front-rear direction is wider on the side-rail 12 side (a root-portion-34B side of the cab mount bracket 34), and the upper bracket 36 is tapered toward its tip side (a tip-end-34C side of the cab mount bracket 34) placed on the outer side in the vehicle width direction.

More specifically, in a plan view, the front wall 36A of the upper bracket 36 is formed along the vehicle width direction, and the rear wall 36B of the upper bracket 36 is formed to expand toward the vehicle rear side. Thus, the root portion 34B of the upper bracket 36 is wider than the tip-end-34C side.

As illustrated in FIG. 4, an R portion 36B1 (an edge line Q) as one of a plurality of reinforcing portions 48 is formed between the upper wall 36C and the rear wall 36B of the upper bracket 36. The rear wall 36B is provided with an inclined wall 36B2 on its outer side in the vehicle width direction and is also provided with an inclined wall 36B3 on its inner side in the vehicle width direction as an inclined portion, such that the inclined wall 36B2 and the inclined wall 36B3 are formed in a continuous manner. Note that the R portion 36B1 has a function as a reinforcing portion and also functions as an inclined portion.

As illustrated in FIG. 3, the inclined walls 36B2, 36B3 are inclined inward in the vehicle width direction toward the rear side, and an inclination angle of the inclined wall 36B3 relative to a reference line P along the vehicle width direction is smaller than that of the inclined wall 36B2. Further, on an extended line of the inclined wall 36B3, a flange-shaped joining portion 28A is provided in an end of the cross member 28.

Figure 7:
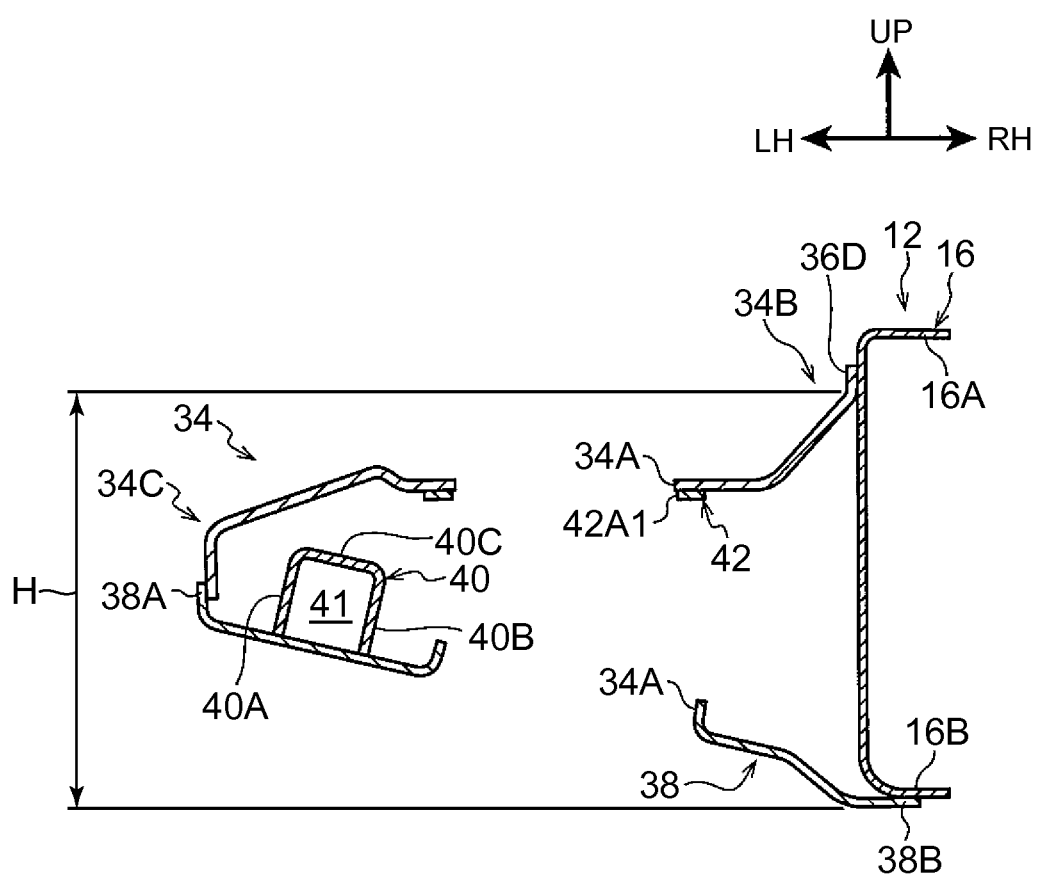
FIG. 7 is a drawing of a longitudinal section illustrating the outrigger taken along a line VII-VII in FIG. 3.

FIG. 7 is a drawing of a longitudinal section taken along a line VII-VII in FIG. 3. As illustrated in FIG. 7, the upper bracket 36 is formed such that a thickness (height) dimension H along the vehicle up-down direction is larger on the side-rail 12 side (the root-portion-34B side of the cab mount bracket 34). Accordingly, the upper wall 36C of the upper bracket 36 is inclined downward from the root portion 34B of the upper bracket 36 toward the tip end 34C thereof.

In the meantime, as illustrated in FIG. 4, the lower bracket 38 has a plate shape, and an edge portion 38A to rise upward is provided in an outer edge thereof. In a plan view, the lower bracket 38 is formed to be slightly larger than the upper bracket 36, such that the edge portion 38A of the lower bracket 38 covers a lower end of the upper bracket 36 from its outside and is joined to the upper bracket 36 by welding or the like (see FIG. 2).

An inner flange portion 38B is provided in an inner end of the lower bracket 38 in the vehicle width direction, and the inner flange portion 38B is joined to the lower wall 16B of the side rail outer 16 of the side rail 12 by welding or the like (see FIG. 7).

As illustrated in FIG. 7, in the tip end 34C of the cab mount bracket 34, a metal bulk head 40 is disposed between the upper bracket 36 and the lower bracket 38. The bulk head 40 is configured such that its section taken along the vehicle width direction has a generally reversed U-shape that is open downward. The bulk head 40 is constituted by an outer wall 40A placed on its outer side in the vehicle width direction, an inner wall 40B placed on its inner side in the vehicle width direction, and an upper wall 40C that connects the inner wall 40B to the outer wall 40A.

Further, the bulk head 40 is joined to the upper bracket 36 by welding. In a state where the bulk head 40 is joined to the upper bracket 36, the bulk head 40 forms a closed section portion 41 with the lower bracket 38, thereby improving rigidity of the tip end 34C of the cab mount bracket 34.

As illustrated in FIG. 3, in a rear end of the bulk head 40, the inner wall 40B extends toward the rear side more than the outer wall 40A in accordance with a shape of the rear wall 36B of the upper bracket 36, and the inner wall 40B and the outer wall 40A are both formed close to the rear wall 36B of the upper bracket 36. Further, an inclined piece 40D inclined inward toward the rear side is formed in a rear part of the upper wall 40C of the bulk head 40.

Further, as illustrated in FIG. 6, a plate-shaped patch member 42 including a plurality of reinforcing portions 47, 48 is joined, by welding, to a back surface 36C1 of the upper bracket 36 along the vehicle front-rear direction of the upper bracket 36. As illustrated in FIG. 3, the patch member 42 is configured such that its front part 42A has a shape to abut with a surrounding portion of the attachment hole 34A of the upper bracket 36, and its rear part 42B has a shape to abut with the upper bracket 36 along the vehicle width direction.

As illustrated in FIG. 4, an opening 42A1 communicating with the attachment hole 34A is formed in the front part 42A of the patch member 42. Behind the opening 42A1, a stepped portion 42A2 as another one of the reinforcing portions 47 is formed so as to abut with the stepped portion 36E formed in the upper bracket 36 (see FIG. 6).

Further, in the rear part 42B of the patch member 42, a rear wall 42B1 as an inclined wall to abut with the rear wall 36B of the upper bracket 36 is formed (see FIG. 6). In an upper end of the rear wall 42B1, an R portion 42B2 (an edge line R) is formed as another one of the reinforcing portions 48 so as to abut with the R portion 36B1 (the edge line Q) formed between the upper wall 36C and the rear wall 36B of the upper bracket 36 (see FIG. 6). Note that, similarly to the R portion 36B1, the R portion 42B2 has a function as a reinforcing portion and also functions as an inclined portion.

As illustrated in FIG. 3, a metal bulk head 44 as a load transmission member is provided within the closed section portion 18 (see FIG. 8) of the side rail 12, so as to be opposed to the rear part 42B (the rear part 34D of the cab mount bracket 34) of the patch member 42. The bulk head 44 has a generally reversed U-shape that is open outward in the vehicle width direction in a plan view.

Figure 5:
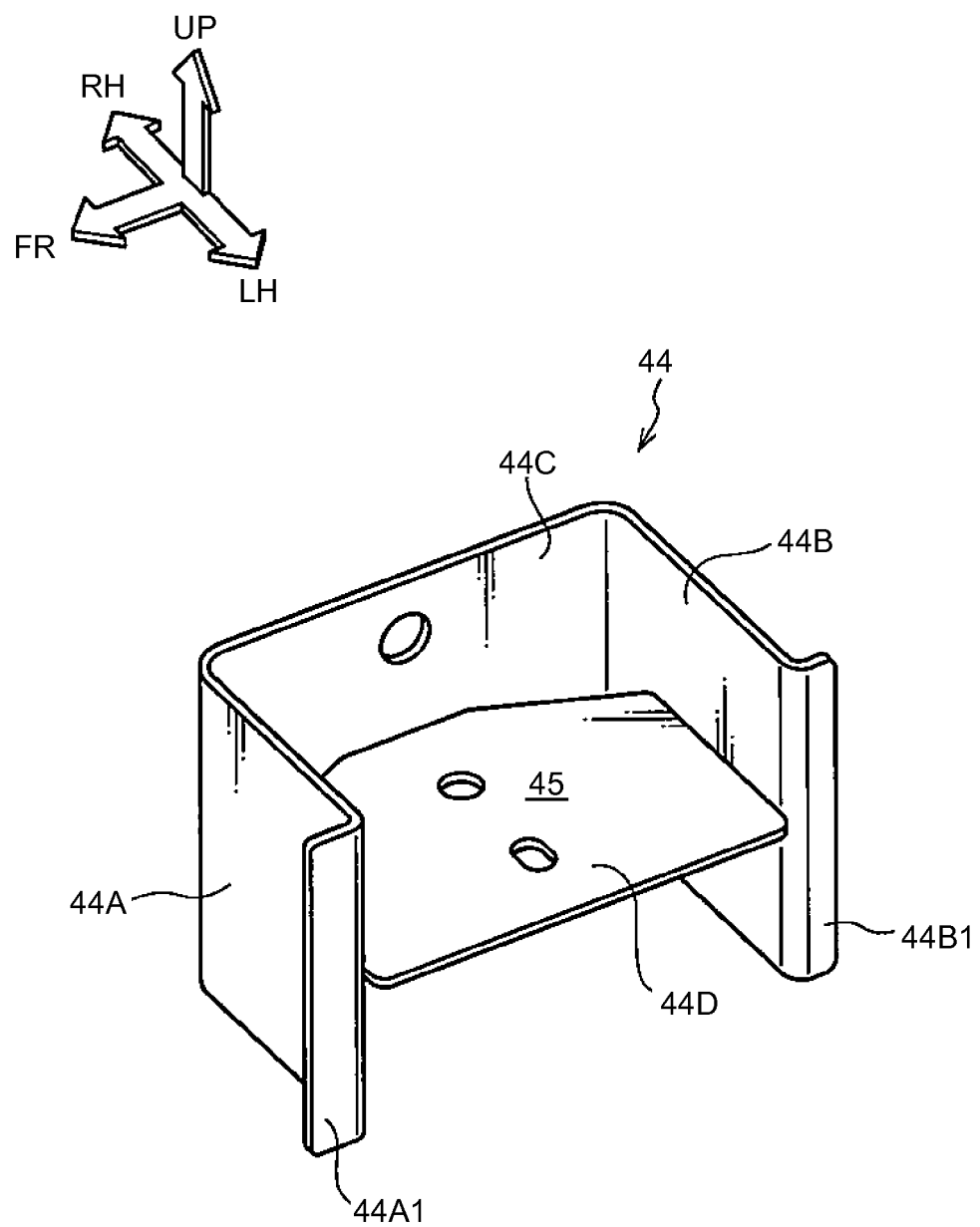
FIG. 5 is an exploded perspective view to describe other part of the configuration of the vehicle framework structure according to the embodiment of the present invention.

As illustrated in FIG. 5, the bulk head 44 includes: a front wall 44A (a front part, in the vehicle front-rear direction, of the load transmission member) placed in a front part of the bulk head 44 and formed along the vehicle width direction; a rear wall 44B (a rear part, in the vehicle front-rear direction, of the load transmission member) placed in a rear part of the bulk head 44 and formed along the vehicle width direction; and an inner wall 44C formed along the vehicle front-rear direction and configured to connect the front wall 44A to the rear wall 44B.

In a generally central part of the bulk head 44 in the up-down direction in a space 45 surrounded by the front wall 44A, the inner wall 44C, and the rear wall 44B, a reinforcing sheet 44D configured to connect the front wall 44A, the inner wall 44C, and the rear wall 44B so as to reinforce the bulk head 44 in a horizontal plane direction is provided. A front flange portion 44A1 and a rear flange portion 44B1 bent toward a direction where the front wall 44A and the rear wall 44B are distanced from each other are formed in respective tip ends of the front wall 44A and the rear wall 44B.

As illustrated in FIG. 3, the front flange portion 44A1 and the rear flange portion 44B1 abut with the side rail 12, so as to be joined thereto by welding. In a state where the bulk head 44 is joined to the side rail 12, the bulk head 44 forms a closed section portion 46 with the side rail 12, so as to improve rigidity of the side rail 12.

The front wall 44A of the bulk head 44 is placed so as to be opposed to the rear part 42B of the patch member 42 with the side rail 12 being placed therebetween, and the rear wall 44B of the bulk head 44 is placed so as to be opposed to the joining portion 28A of the cross member 28 with the side rail 12 being placed therebetween.

That is, in a vehicle side view, the front wall 44A of the bulk head 44 is placed so as to overlap with the cab mount bracket 34, and the rear wall 44B of the bulk head 44 is placed so as to overlap with the cross member 28. Note that, in the present embodiment, the bulk head 40 and the patch member 42 are placed so as not to abut with each other and the patch member 42 and the bulk head 44 are placed so as not to abut with each other.

(Operation/Effect of Vehicle Framework Structure)

As illustrated in FIG. 1, in the vehicle lower structure 11 of the vehicle 15, the bending portion 22 is formed to be bent outward from the front part 12A of the side rail 12 in the vehicle width direction. The cab mount bracket 34 is provided in the bending portion 22 such that the cab mount bracket 34 projects outward in the vehicle width direction. In view of this, when the vehicle 15 is viewed from the vehicle front side, the cab mount bracket 34 projects most outward in the vehicle width direction in the vehicle lower structure 11.

Accordingly, when a collision load F is input into the cab mount bracket 34 at the time of a small overlap collision, the collision load F is locally concentrated on the cab mount bracket 34. In the present embodiment, as illustrated in FIG. 3, the bulk head 44 having a generally U-shape in a plan view is provided inside the side rail 12, and the front wall 44A of the bulk head 44 is placed so as to overlap with the rear part 34D of the cab mount bracket 34 in a vehicle side view.

Hereby, when the collision load F is input into the cab mount bracket 34, the collision load F (part of the collision load F) can be transmitted to the side rail 12 via the bulk head 44 (see FIG. 3) from the cab mount bracket 34.

Figure 9:
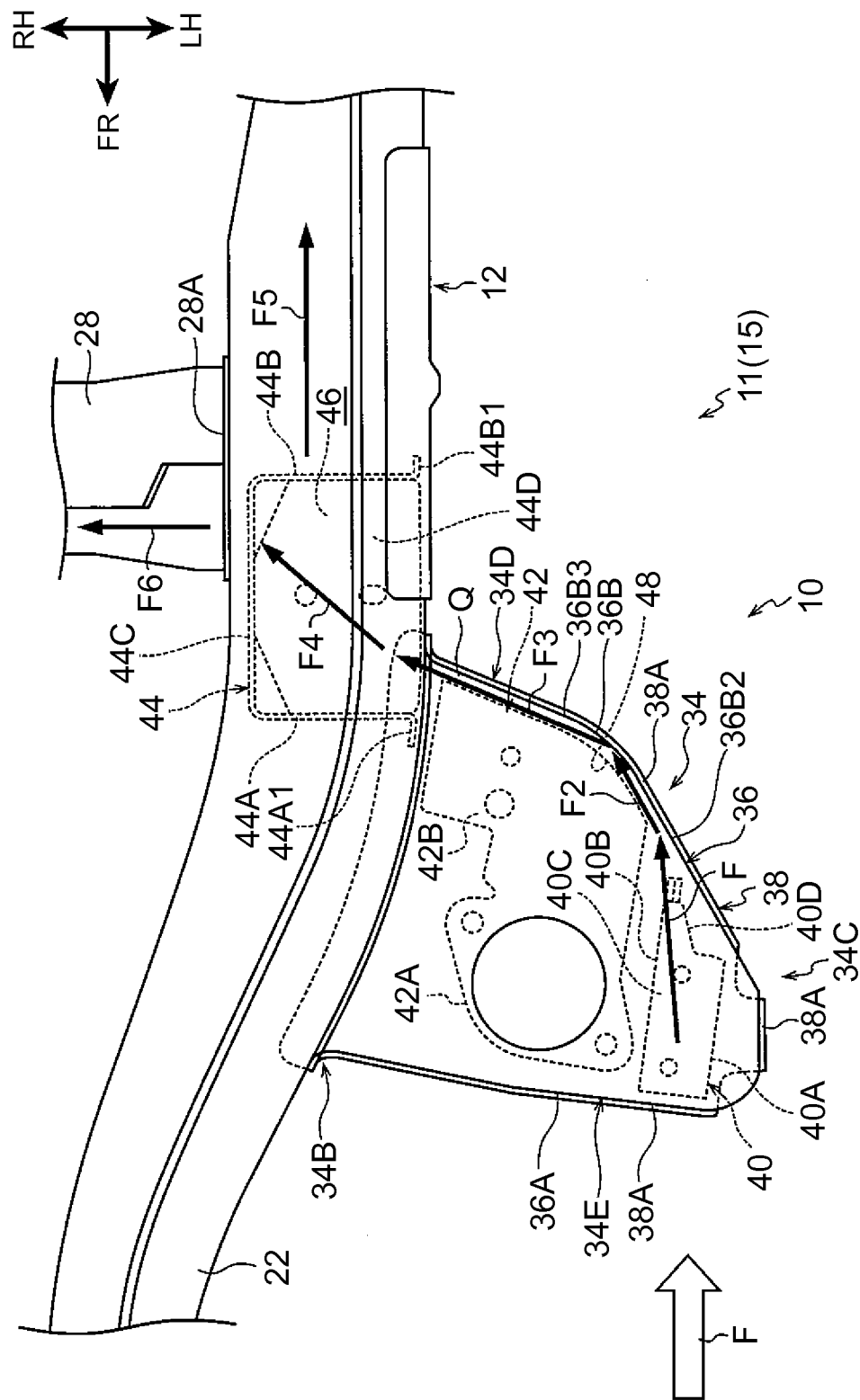
FIG. 9 is a part enlarged plan view, corresponding to FIG. 3, to describe an operation of the vehicle framework structure according to the embodiment of the present invention.

Here, FIG. 9 is a plan view illustrating a part of the vehicle framework structure 10 in FIG. 1 in an enlarged manner. As illustrated in FIG. 9, in the present embodiment, the bulk head 44 is provided so that the front wall 44A of the bulk head 44 overlaps with the rear part 34D of the cab mount bracket 34 in a vehicle side view.

Hereby, when the collision load F is input into the cab mount bracket 34, a collision load F3 transmitted to the bulk head 44 from the cab mount bracket 34 is dispersed in a plane direction of the reinforcing sheet 44D of the bulk head 44 via the reinforcing sheet 44D, and is partially transmitted to the rear side in the vehicle front-rear direction (F4).

Further, the rear wall 44B of the bulk head 44 is placed so as to overlap with the cross member 28 in a vehicle side view. Hereby, when the collision load F is input into the cab mount bracket 34, a collision load F4 can be dispersed to the side rail 12 and the cross member 28 (F5, F6) via the cab mount bracket 34 and the bulk head 44. That is, the collision load F input into the cab mount bracket 34 can be transmitted toward the rear side (F5) in the vehicle front-rear direction and along the vehicle width direction (F6), thereby making it possible to improve load transmission efficiency.

As such, when the bulk head 44 is provided so as to overlap with the cab mount bracket 34 and the cross member 28 in a vehicle side view, the side rail 12 can be reinforced between the cab mount bracket 34 and the cross member 28. This makes it possible to restrain local concentration of stress in the side rail 12.

Further, in the present embodiment, the front wall 44A and the rear wall 44B of the bulk head 44 are formed along the vehicle width direction. Accordingly, it is possible to reinforce the side rail 12 against part of the collision load F3 applied in the vehicle width direction from the cab mount bracket 34. This makes it possible to improve durability of the side rail 12 against stress in the vehicle width direction. Note that either one of the front wall 44A and the rear wall 44B of the bulk head 44 may be formed along the vehicle width direction.

Further, in the present embodiment, the inclined wall 36B3 is provided in the rear part 34D of the cab mount bracket 34 such that the inclined wall 36B3 is directed toward the joining portion 28A at which the cross member 28 is joined to the side rail 12. Accordingly, when the collision load F is input into the cab mount bracket 34, the collision load F can be efficiently transmitted toward the cross member 28 through the bulk head 44 via the inclined wall 36B3. This makes it possible to improve load transmission efficiency from the cab mount bracket 34 to the cross member 28.

Figure 10A:
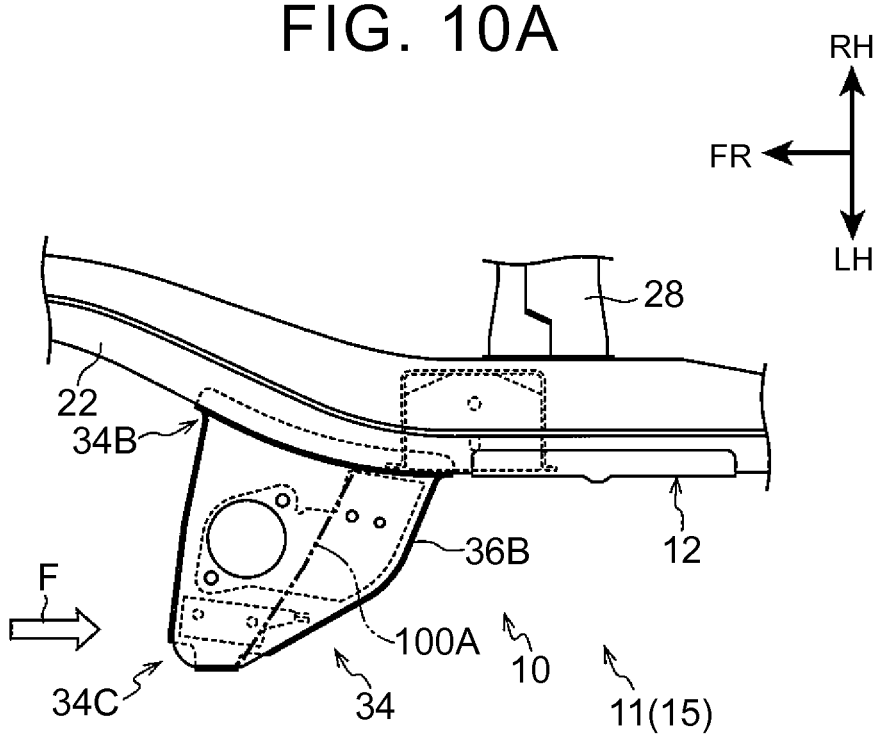
FIG. 10A is a part enlarged plan view, corresponding to FIG. 2, to describe the operation of the vehicle framework structure according to the embodiment of the present invention.
Figure 10B:
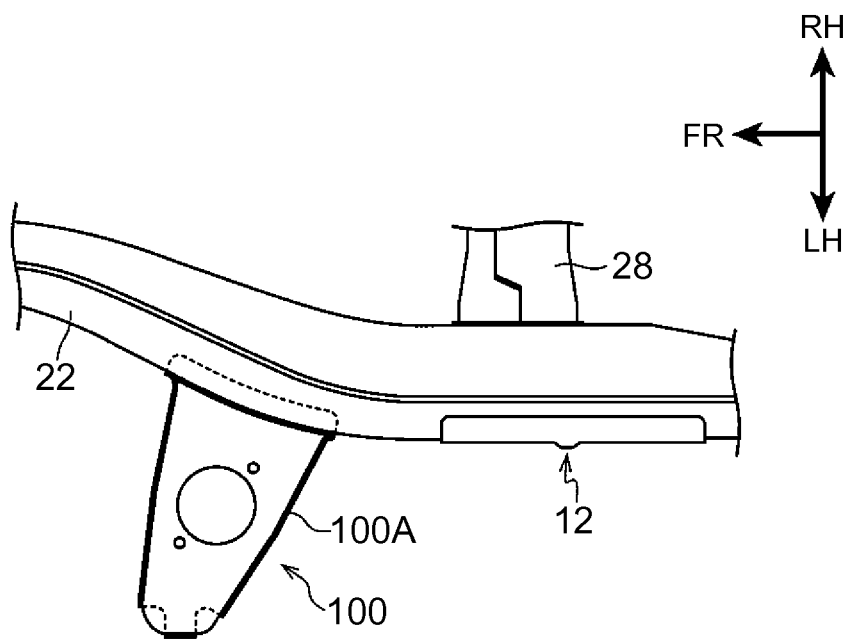
FIG. 10B is a view related to a comparative example.

Further, as illustrated in FIG. 10A, in the present embodiment, the rear-wall-36B side of the upper bracket 36 is formed to expand toward the vehicle rear side, in comparison with a rear wall 100A of an upper bracket 100 illustrated in FIG. 10B. Hereby, in the present embodiment illustrated in FIG. 10A, the root portion 34B of the upper bracket 36 is wider than the tip-end-34C side.

When the cab mount bracket 34 is provided to expand as such, rigidity of the cab mount bracket 34 can be improved. Accordingly, it is possible to restrain deformation of the cab mount bracket 34 at the time when the collision load F is input into the cab mount bracket 34.

Further, in the present embodiment, as illustrated in FIG. 4, the stepped portion 36E (the reinforced portion 47) is formed in the upper wall 36C of the upper bracket 36. Hereby, in comparison with a case where the upper wall 36C of the upper bracket 36 is formed in a flat shape, it is possible to improve strength and rigidity in the upper wall 36C of the upper bracket 36.

Particularly, at the time of running of the vehicle, a load along the up-down direction is input into the cab mount bracket 34. When the cab mount bracket 34 is provided to expand, in-plane deformation is easy to occur in the cab mount bracket 34. In view of this, in a case where the cab mount bracket 34 is provided to expand as such, it is necessary to improve in-plane rigidity of the cab mount bracket 34.

Accordingly, in the present embodiment, the stepped portion 36E is formed in the upper wall 36C of the upper bracket 36 such that the stepped portion 36E extends toward the rear side from the outer side of the attachment hole 34A in the vehicle width direction and further toward the side rail 12 along the vehicle width direction, thereby improving an offset yield strength in the stepped portion 36E. Hereby, it is possible to restrain in-plane deformation in the upper wall 36C, thereby making it possible to decrease a deformation amount of the upper bracket 36. As a result, the rigidity of the cab mount bracket 34 is increased.

Further, in the present embodiment, the patch member 42 is configured such that, behind the opening 42A1, the stepped portion 42A2 (the reinforcing portion 47) that abuts with the stepped portion 36E formed in the upper bracket 36 is formed. The stepped portion 42A2 of the patch member 42 and the stepped portion 36E of the upper bracket 36 overlap with each other, so that the strength and rigidity of the cab mount bracket 34 are further increased. When the reinforcing portion 47 is provided in the rear part 34D of the cab mount bracket 34 as such, the rear part 34D of the cab mount bracket 34 is configured to have strength and rigidity higher than those of the front part 34E.

Hereby, as illustrated in FIG. 2, when a collision load F is input into the cab mount bracket 34, the collision load F (part of the collision load F) can be surely transmitted to the bulk head 44 from the cab mount bracket 34 via the reinforcing portion 47. That is, when the collision load F is input into the cab mount bracket 34, it is possible to effectively transmit the load to the rear side of the cab mount bracket 34.

Further, as illustrated in FIG. 4, the rear part 42B of the patch member 42 includes the rear wall 42B1 formed to abut with the rear wall 36B of the upper bracket 36. The upper end of the rear wall 42B1 includes the R portion 42B2 (the reinforced portion 48; the edge line R) formed to abut with the R portion 36B1 (the reinforced portion 48; the edge line Q) formed between the upper wall 36C and the rear wall 36B of the upper bracket 36.

The R portion 42B2 of the patch member 42 and the R portion 36B1 of the upper bracket 36 overlap with each other, so that the strength and rigidity of the cab mount bracket 34 are further increased. When the reinforcing portion 48 is provided in the rear part 34D of the cab mount bracket 34 as such, the rear part 34D of the cab mount bracket 34 is configured to have strength and rigidity higher than those of the front part 34E.

Hereby, as illustrated in FIG. 9, when a collision load F is input into the cab mount bracket 34, the collision load F (part of the collision load F) can be surely transmitted to the bulk head 44 from the cab mount bracket 34 via the reinforcing portion 48. That is, when the collision load F is input into the cab mount bracket 34, it is possible to effectively transmit the load to the rear side of the cab mount bracket 34.

In the meantime, as illustrated in FIG. 7, the cab mount bracket 34 is formed such that the thickness dimension H along the vehicle up-down direction is larger on the rootportion-34B side than on the tip-end-34C side. Hereby, the cab mount bracket 34 is configured such that the tip-end-34C side is thinned while necessary strength and rigidity are secured, thereby making it possible to inhibit interference with peripheral components and to achieve lightweighting.

Further, as illustrated in FIG. 3, the bulk head 40 is disposed in the tip end 34C of the cab mount bracket 34. Hereby, the strength and rigidity of the cab mount bracket 34 are improved. In the rear end of the bulk head 40, the outer wall 40A and the inner wall 40B are formed close to the rear wall 36B of the upper bracket 36 in accordance with the shape of the rear wall 36B of the upper bracket 36. Further, the inclined piece 40D inclined inward toward the rear side is formed in the rear part of the upper wall 40C of the bulk head 40.

When the inclined piece 40D is provided as such, the outer wall 40A and the inner wall 40B are reinforced, thereby making it possible to improve strength and rigidity of the bulk head 40 itself. Further, as illustrated in FIG. 9, when a collision load F is input into the cab mount bracket 34, the inclined piece 40D of the bulk head 40 serves as a wedge, so that impact loads (F2, F3) can be transmitted along the edge line Q (the reinforced portion 48) formed in the upper bracket 36.

Further, in the present embodiment, the bulk head 40 and the patch member 42 are configured so as not to abut with each other, and the patch member 42 and the bulk head 44 are configured so as not to abut with each other. Hereby, occurrence of abnormal noise due to interference between members is inhibited at the time of running of the vehicle 15. When a collision load F is input into the cab mount bracket 34, the bulk head 40 abuts with the patch member 42 and the patch member 42 abuts with the bulk head 44 due to deformation or the like of the cab mount bracket 34, so that an impact load is transmitted therebetween.

(Other Embodiment)

In the present embodiment, as illustrated in FIG. 3, the front wall 44A of the bulk head 44 is placed so as to overlap with the rear part 34D of the cab mount bracket 34. However, other configurations may be employed, provided that the bulk head 44 provided inside the side rail 12 overlaps with the cab mount bracket 34 in a vehicle side view. In view of this, for example, in a vehicle side view, the bulk head 44 may be configured to be included inside the cab mount bracket 34, or the front wall 44A of the bulk head 44 may be configured to overlap with the front part 34E of the cab mount bracket 34.

Further, in the present embodiment, the rear wall 44B of the bulk head 44 is placed so as to overlap with the cross member 28. However, other configurations may be employed, provided that the bulk head 44 overlaps with the cross member 28 in a vehicle side view. In view of this, the rear part of the bulk head 44 may be configured to extend toward the rear side of the cross member 28. In this case, although not illustrated herein, it is preferable that a up-down wall be formed in the bulk head along the vehicle width direction.

As such, shapes and the like of the bulk head 40, the patch member 42, and the bulk head 44 are not limited to the shapes as described in the present embodiment. Further, the bulk head 40 and the patch member 42 are not necessarily required.

Further, the present embodiment deals with an example in which the above configuration is applied to respective cab mount brackets 34 provided on opposite sides in the vehicle width direction, but the above configuration may be applied to at least the cab mount bracket 34 on a driver side.

One embodiment of the present invention has been explained as above, but it should be understood that the present invention is not limited to the above embodiment, and the one embodiment and various modified embodiments may be employed in combination appropriately or the present invention may be performable in various aspects without departing from the gist of the present invention.

What is claimed is:

1. A vehicle framework structure comprising:
a side rail that is placed on an outer side, in a vehicle width direction, of a vehicle lower portion of a vehicle with a frame, and that is extended along a vehicle front-rear direction, a dimension, in a vehicle width direction, between front sides of the side rails in the vehicle front-rear direction being shorter than that between rear sides thereof, and the front side in the vehicle front-rear direction being connected to the rear side by a bending portion;
an outrigger provided in the bending portion and projecting outward in the vehicle width direction; and
a load transmission member provided in the side rail, the load transmission member overlapping with the outrigger in a vehicle side view.

2. The vehicle framework structure according to claim 1, wherein
a front part of the load transmission member in the vehicle front-rear direction overlaps with a rear part of the outrigger in the vehicle front-rear direction in a vehicle side view.

3. The vehicle framework structure according to claim 1, wherein
the load transmission member is provided with at least one of a front wall placed in a front part of the load transmission member in the vehicle front-rear direction and formed along the vehicle width direction, or a rear wall placed in a rear part of the load transmission member in the vehicle front-rear direction and formed along the vehicle width direction.

4. The vehicle framework structure according to claim 1, wherein
a cross member is provided over a pair of side rails disposed on opposite sides in the vehicle width direction and placed on a rear side with respect to the outrigger in the vehicle front-rear direction, and the cross member overlaps with the load transmission member in a vehicle side view.

5. The vehicle framework structure according to claim 4, wherein
an inclined portion inclined toward a joining portion of the cross member to the side rail is provided in a rear end of the outrigger in the vehicle front-rear direction.

6. The vehicle framework structure according to claim 1, wherein
a reinforcing portion is provided in a rear part of the outrigger in the vehicle front-rear direction, and the rear part of the outrigger in the vehicle front-rear direction is set to have strength higher than that of a front part thereof in the vehicle front-rear direction.

* * * * *